United States Patent Office 3,402,051
Patented Sept. 17, 1968

3,402,051
PROCESS OF IMPARTING A POPCORN-LIKE FLAVOR AND AROMA TO FOODSTUFFS AND TOBACCO BY INCORPORATING PYRAZINE DERIVATIVES THEREIN AND THE RESULTING PRODUCTS
Donald L. Roberts, Winston-Salem, N.C., assignor to R. J. Reynolds Tobacco Company, Winston-Salem, N.C., a corporation of New Jersey
No Drawing. Continuation-in-part of application Ser. No. 388,289, Aug. 7, 1964. This application Apr. 10, 1967, Ser. No. 629,357
19 Claims. (Cl. 99—140)

ABSTRACT OF THE DISCLOSURE

Flavoring of tobacco and foodstuffs by incorporating therewith a small amount of a compound selected from 2-acetyl-pyrazine, 2-acetyl-6-methylpyrazine and 2-acetyl-5-methylpyrazine.

---

This application is a continuation-in-part of my copending application Ser. No. 388,289 filed Aug. 7, 1964, now abandoned.

This invention relates to imparting a desired flavor and aroma to tobacco and foodstuffs.

In accordance with the present invention, a popcorn-like flavor is imparted to tobacco or foodstuffs by incorporating therewith a small amount of 2-acetylpyrazine (herein referred to as Compound I), 2-acetyl-6-methylpyrazine (herein referred to as Compound II) and 2-acetyl-5-methylpyrazine (herein referred to as Compound III). The chemical structure of these compounds may be represented by the following formulae:

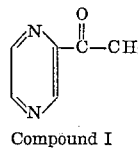 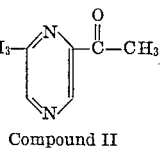 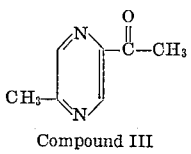

Compound I     Compound II     Compound III

Compound I indicated above can be synthesized by dehydrating the commercially available pyrazinamide to form a nitrile and reacting the so-formed nitrile with a methyl Grignard agent. This method of synthesis can be illustrated as follows:

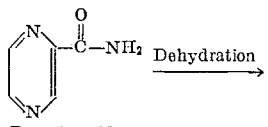

Pyrazinamide

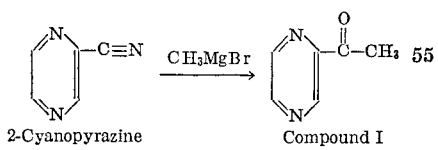

2-Cyanopyrazine     Compound I

A detailed description of the synthesis of Compound I is as follows:

(a) Preparation of 2-cyanopyrazine

Nine grams of pyrazinamide was dissolved in 45 milliliters of phosphorous oxychloride, and the mixture was heated with stirring on a water bath for 1.5 hours. The solution was then vacuum distilled to remove the excess phosphorous oxychloride. After adding 90 milliliters of saturated sodium carbonate solution to the cooled residue, the solution was extracted with ether. Distillation of the dried ether solution gave 7 grams of 2-cyanopyrazine (91 percent yield).

(b) Preparation of 2-acetylpyrazine 2-cyanopyrazine (13.4 grams, 0.128 moles) in 50 milliliters of ether was added dropwise to a cold (0–5°) solution of 100 milliliters of 3 M methyl magnesium bromide in 100 milliliters of ether. After the addition was completed, 500 milliliters of ice water was added to the cold solution, and the mixture was extracted with ether. The dried ether solution was distilled to remove the ether, and the residue upon crystallization from hexane gave 2-acetylpyrazine (8.5 grams, 5.5 percent yield).

Compound I is a solid having a melting point of 74–76° C. and the following characterization.

Ultraviolet spectrum:

$$\lambda_{max.}^{EtOH}\ 269\ m\mu.$$

Infrared spectrum: 1683, 1570, 1282, 1163, 1102, 1043, 1020, 950 and 858 cm.$^{-1}$.

Nuclear Magnetic Resonance spectrum: $\tau=0.82$ (1, doublet), 1.28 (1, doublet), 1.37 (1, quadruple), and 7.28 (3).

Analysis.—Calcd. for $C_6H_6N_2O$: C, 59.01; H, 4.95; mol. wt., 122. Found: C, 58.86; H, 4.98; mass, 122.

Compounds II and III can be synthesized by the same procedure as given above for Compound I. A detailed description of the synthesis of Compound II is as follows:

(a) Preparation of 5- and 6-methyl-2-pyrazinoic acid

The "Organic Synthesis" procedure for aqueous permanganate oxidation of quinoxaline was followed using 162 grams (1.12 moles) of 2-methyl-quinoxaline. In the work up, one-half pound of a filter aid material was stirred into the mixture before filtering the hot aqueous solution containing maganese dioxide. The hot solution was filtered readily, and the 10 liters of filtrate were concentrated to 3 liters on a vacuum evaporator unit at 62° C. The solution then was acidified and concentrated in vacuo at below 50° C. The dried material was extracted thoroughly with acetone, the acetone solution was treated with charcoal, and the resulting acetone solution was concentrated. A brown solid was obtained which was a dicarboxylic acid, but it was not purified.

The brown solid was placed in a vacuum sublimator and sublimed at 175–210° at 1 millimeter pressure. The yield of crude 5- and 6-methyl pyrazinoic acid was 50.5 grams, melting point 149–154° [Lit. M.P. 6-methyl acid, 138°, 5-methyl acid, 200°].

(b) Preparation of methyl esters of 5- and 6-methyl-2-pyrazinoic acids

The mixture (50.5 grams) of 5- and 6-methyl-2-pyrazinoic acid was added to 505 milliliters of methanol which had been saturated with hydrogen chloride. The solution was concentrated under vacuum, the residue was neutralized with a 10 percent solution of sodium carbonate, and the product was extracted into ethyl acetate. After evaporation of the ethyl acetate, the reddish residue was sublimed at ca. 4 millimeters pressure and 100°. The colorless needles which were recrystallized from ethyl ether and isopropyl ether melted at 94–96°. Gas chromographic analysis of the crystalline material and the mother liquors showed the presence of the following three components: methyl 6-methyl-2-pyrazinoate (ca. 85 percent of the product), methyl 5-methyl-2-pyrazinoate, and methyl 2-pyrazinoate (trace).

(c) Preparation of 6-methyl-2-pyrazinamide

Methyl 6-methyl-2-pyrazinoate (21.8 grams) was dissolved in 22 milliliters of methanol, and this solution was added to 44 milliliters of cold (0°) methanol saturated with ammonia. After standing overnight the crystalline precipitate was filtered and washed with methanol and ether; 12 grams of 6-methyl-2-pyrazinamide was obtained.

Compound II was synthesized from 6-methyl-2-pyrazinamide using procedures similar to those employed above for conversion of 2-pyrazinamide into 2-acetylpyrazine. For synthesis of Compound III, the 5-methyl-2-pyrazinamide is employed.

Compound II is a solid having a melting point of 56° C. and the following characterization:

Ultraviolet spectrum: $\lambda_{max.}^{EtOH}$ 274 m$\mu$. ($\epsilon = 7600$) and 229 m$\mu$. ($\epsilon = 6600$)

Infrared spectrum: 1695, 1570, 1268, 1175, 1097, 1030, 950, and 900 cm.$^{-1}$.

Nuclear Magnetic Resonance spectrum: $\tau = 0.86$ (1, doublet), 1.47 (1, doublet), 7.30 (3), and 7.34 (3).

Mass spectrum: parent peak at 136.

It is well known in the tobacco art that the domestic tobaccos which are exemplified by burley, Maryland, flue-cured, bright leaf or Virginia tobaccos are low in flavor as compared with so-called oriental or aromatic tobaccos which are imported from Turkey, Greece, Bulgaria, Yugoslavia, Rhodesia and Russia. Accordingly, it has been common practice in the tobacco industry to prepare blends of domestic and oriental tobaccos in order to provide cigarettes which have desired flavor and aroma characteristics. Thus, it is a principal object of this invention to provide a tobacco which has an enhanced flavor and aroma.

In accordance with one embodiment of the invention, the designated additives are added to tobacco in amounts to provide generally a tobacco in which is dispersed about 0.00005 to about 0.3 percent by weight of the additive. Preferably the amount of additive is between about 0.0003 and about 0.2 percent by weight in order to provide tobacco having a desired flavor and aroma. The preferred percentages may be somewhat less, however, if other flavorants imparting a desired aroma are also employed. The additives may be applied in any suitable manner and preferably in the form of a liquid solution or suspension by spraying, dipping or otherwise. The additives may be incorporated at any step in the treatment of the tobacco, but are preferably added after aging, curing and shredding and before the tobacco is formed into tobacco products such as cigarettes, cigars and the like. Likewise, it will be apparent that only a portion of the tobacco need be treated and the thus treated tobacco may be blended with other tobaccos before the tobacco products are formed. In such cases, the tobacco treated may have the additives in excess of the amounts above indicated so that when blended with other tobaccos the final product will have the percentage within the indicated range.

In accordance with one specific example of this invention, an aged, cured and shredded domestic burley tobacco is sprayed with a one percent ethyl alcohol solution of an above indicated compound in an amount to provide a tobacco composition containing 0.005 percent by weight of the additive on a dry basis. Thereafter the alcohol is removed by evaporation and the tobacco is manufactured into the cigarettes by the usual techniques. The cigarette when treated as indicated has a desired and pleasing aroma which is detectable in the main and side smoke streams when the cigarette is smoked; this aroma is described by some smokers as a popcorn-like note.

It will be particularly apparent that the manner in which the additives are applied to the tobacco is not particularly important since, as indicated, it may be done in the form of spraying or dipping, utilizing suitable suspensions or solutions of the additive. Thus, water or volatile organic solvents, such as alcohol, ether, acetone, volatile hydrocarbons and the like, may be used as the carrying medium for the additive while it is being applied to the tobacco. Also, other flavor and aroma producing additives, such as those disclosed in Jones United States Patent No. 2,766,145 and Schumacher United States Patent No. 2,978,365, may be incorporated into the tobacco with the additives of this invention.

While this invention is particularly useful in the manufacture of cigarette tobacco, it is also suitable for use in connection with the manufacture of pipe tobacco, cigars and other tobacco products formed from sheeted tobacco dust or fines which are well known to the art. Likewise, the additives of the invention can be incorporated with materials such as filter tip materials, seam paste, packaging materials and the like which are used along with tobacco to form a product adapted for smoking. Furthermore, the compounds can be added to certain tobacco substitutes of natural or synthetic origin and by the term "tobacco" as used throughout this specification is meant any composition intended for human consumption by smoking or otherwise, whether composed of tobacco plant parts or substitute materials or both.

In accordance with another embodiment of this invention a small amount of Compound I or Compound II or Compound III or mixtures thereof is incorporated with foodstuffs to impart thereto a desirable popcorn-like flavor and aroma. These flavoring or seasoning additives can be utilized with any food or drink to which it is desired to impart a popcorn-like flavor and accordingly the term "foodstuff" as used herein embraces both solid foods and drinking liquids which may have little or no food value. For example, the above compounds can be utilized to flavor or season snack-foods such as potato or corn chips, puffed products, crackers and the like; cereals and processed cereals such as corn, wheat, rice and flour; vegetables and processed vegetables such as corn, carrots, potatoes, frozen corn, and dehydrated potatoes; seasonings such as imitation butter flavor, table salt and monnosodium glutamate; fats and oils such as cotton seed oil, soy bean oil, olive oil and peanut oil; emulsified fats and oils such as butter and margarine; dairy products such as cheese; juices, drink concentrates, soft drinks and the like; candies and processed meat products and so forth.

The flavorants or seasonings are utilized with foodstuffs in relatively small amounts and the specific amount to employ in each case will depend upon the degree or intensity of flavoring desired as well as processing contemplated for the foodstuff with which they are incorporated. In general, the flavorants are employed in foodstuffs in amounts ranging from about 0.00003 percent to 0.3 percent by weight. Due to volatilization, greater amounts of the seasoning additives are usually employed with foodstuffs which undergo heating or cooking after the flavorants are added thereto. A generally preferred level for the seasoning additive in foodstuffs in prepared or final state is from about 0.0005 to 0.005 percent by weight.

The flavorants can be incorporated with food stuffs in any convenient manner. Thus, the flavorants can be applied to the surface of a solid food product by spraying or dipping the food product with a suitable solution of the additive, such as a water, alcohol or oil solution thereof. Also, the flavorant can be incorporated with foodstuffs by fixing them on a solid support such as flour or salt which is then added to the foodstuffs. A flavor concentrate such as a butter or margarine containing the flavorants can likewise be employed for incorporating the additive with the final food product. The seasonings can be incorporated with the foodstuffs before or after processing, that is, before cooking or baking of the food product.

The following examples illustrate the inventin and the advantages thereof.

EXAMPLE I

An imitation butter popcorn flavored concentrate containing 2-acetylpyrazine in an amount of 0.05 percent by weight is formulated as follows:

| | Grams |
|---|---|
| 2-acetylpyrazine | 0.50 |
| Benzilidine acetone | 2.64 |
| Cinnamic aldehyde | 3.74 |
| Heliotropin | 4.62 |
| Valeric acid | 5.50 |
| Cinnamyl butyrate | 8.80 |
| Ethylbutyrate | 9.24 |
| Benzodihydropyrone | 11.88 |
| Vanillin | 36.74 |
| Lactic acid | 45.54 |
| Butyric acid | 338.58 |
| Diacetyl | 532.22 |
| Total | 1000.00 |

EXAMPLE II

Illustrative of the use of flavor concentrates in baked goods, the above flavor concentrate is utilized to prepare a pound cake. The following ingredients are employed:

| | Grams |
|---|---|
| Flour | 350 |
| Sugar | 350 |
| Shortening | 210 |
| Milk powder | 20 |
| Salt | 10 |
| Water | 130 |
| Eggs | 218 |

In addition to the above ingredients there is utilized 12.8 grams of a mix comprising one percent of the above flavor concentrate and 99 percent of an edible filler material. A pound cake is prepared following these instructions: "Sift flour twice. Place all ingredients in large mixing bowl. Mix on low speed one minute and scrape well. Mix on second speed five minutes and scrape. Mix on second speed five minutes longer and scrape. Finish mixing on second speed for two minutes. Do not scrape. Scale 2½ pounds into paper lined pans, very lightly greased, or lined with brown paper. Bake at 325° F. for 1½ hours." A popcorn-like flavor and aroma is detectable in the baked pound cake.

EXAMPLE III

A popcorn flavored margarine is prepared by blending into soft margarine 2-acetyl-6-methylpyrazine or 2-acetyl-5-methylpyrazine at a level of about 0.01 percent by weight. The flavored margarine can then be used as is regular margarine.

EXAMPLE IV

A flavored margarine is prepared by intimately mixing 0.10 grams of 2-acetylpyrazine with 20 grams of margarine. A small amount of this mixture spread on unsalted crackers gives a product of improved flavor and aroma.

EXAMPLE V

Frozen corn (50 grams) is brought to a boil in 30 milliliters of water. After completion of the cooking 5 grams of margarine containing 2-acetylpyrazine is added. Five out of seven flavor evaluation panelists indicated a preference for the corn containing the flavored margarine.

EXAMPLE VI

Mashed potatoes are prepared from dehydrated potatoes in the usual manner using:

| | | |
|---|---|---|
| Dehydrated potatoes | g | 20 |
| Water | ml | 30 |
| Margarine | g | 7 |
| Salt | g | 0.2 |
| Milk | ml | 12 |
| 2-acetylpyrazine | g | .01 |

To a boiling mixture of water, margarine, and salt is added 2-acetylpyrazine followed by milk and dehydrated potatoes. The flavored potatoes are preferred by a margin of six to one by a flavor evaluation panel over the non-flavored potatoes.

EXAMPLE VII

An alcoholic solution of 2-acetylpyrazine was made containing 1 percent by weight/volume of additive in ethanol. This solution was sprayed on a bland corn-based chip to give an approximate level of .04 percent by weight. The product was air dried before tasting. A flavor evaluation panel preferred the treated chips six to one over the control with the treated chips having a popcorn-like flavor and aroma.

EXAMPLE VIII

A commercial yellow cake mix was compounded in the prescribed manner adding water, eggs and margarine. The margarine contained 0.75 percent of 2-acetylpyrazine. The cake was baked as cupcakes and compared with non-flavored cakes; all members of a flavor evaluation panel were able to detect the additive in the cupcakes.

As is apparent from the foregoing, by practice of the present invention significant improvement in the flavor and aroma of tobacco and foodstuffs can be readily accomplished. Surprisingly, Compound I, II or III mixtures thereof when incorporated with tobacco or foodstuffs in relatively small amounts impart thereto a popcorn-like flavor or aroma. The imparted flavor and aroma is distinguishable even though the tobacco is pyrolyzed and the foodstuffs subjected to normal processing such as cooking or baking.

The foregoing description is illustrative of the invention and it is to be understood that modifications can be adopted in the practice thereof. For example, the disclosed flavoring additives can be incorporated with foodstuffs by applying the additives to the packaging material employed for the foodstuff, e.g. cellophane and other enwrapments for the food can be spray coated with a solution of the flavorants. Likewise, treatment of domestic tobaccos with the flavorants is particularly advantageous since such tobaccos are generally low in flavor as compared with oriental or aromatic tobaccos but certainly there latter tobaccos can be advantageously treated in accordance with the invention. Thus, those modifications and equivalents which fall within the spirit of the invention and the scope of the appended claims are to be considered part of the invention.

Throughout this application all degrees are centigrade unless otherwise indicated.

I claim:
1. A product selected from among tobacco and foodstuffs having added thereto an effective amount up to 0.3% by weight of said product and sufficient to alter the flavor thereof of a compound selected from the group consisting of 2-acetylpyrazine, 2-acetyl-6-methylpyrazine and 2-acetyl-5-methylpyrazine.

2. Tobacco having added thereto an effective amount up to 0.3% by weight of said tobacco and sufficient to alter the flavor thereof of a compound selected from the group consisting of 2-acetylpyrazine, 2-acetyl-6-methylpyrazine and 2-acetyl-5-methylpyrazine.

3. The tobacco of claim 2 wherein the amount of the compound added to the tobacco is between about 0.00005 and 0.3 percent by weight.

4. The tobacco of claim 2 wherein the amount of the compound added to the tobacco is between about 0.0003 and 0.02 percent by weight.

5. A tobacco product having added thereto an effective amount up to 0.3% by weight of said tobacco product and sufficient to alter the flavor thereof of a compound selected from the group consisting of 2-acetylpyrazine, 2-acetyl-6-methylpyrazine and 2-acetyl-5-methylpyrazine.

6. The tobacco product of claim 5 wherein the amount of the compound added to the tobacco product is between about 0.00005 and 0.03 percent by weight.

7. A process of improving tobacco which comprises adding thereto an effective amount up to 0.3% by weight of said tobacco and sufficient to alter the flavor of the tobacco of a compound selected from the group consisting of 2-acetylpyrazine, 2-acetyl-6-methylpyrazine and 2-acetyl-5-methylpyrazine.

8. The process of claim 7 wherein the amount of the compound added to the tobacco is between about 0.00005 and 0.3 percent by weight.

9. The process of claim 7 wherein the amount of the compound added to the tobacco is between about 0.0003 and 0.02 percent by weight.

10. The process of claim 7 wherein the compound added to the tobacco is 2-acetylpyrazine.

11. The process of claim 7 wherein the compound added to the tobacco is 2-acetyl-6-methylpyrazine.

12. The process of claim 7 wherein the compound added to the tobacco is 2-acetyl-5-methylpyrazine.

13. A foodstuff having added thereto an effective amount sufficient in quantity to impart to said foodstuff a popcorn-like flavor or aroma of a compound selected from the group consisting of 2-acetylpyrazine, 2-acetyl-6-methylpyrazine and 2-acetyl-5-methylpyrazine.

14. The foodstuff of claim 13 wherein the amount of the compound added to the foodstuff is between about 0.00003 and 0.3 percent by weight.

15. The foodstuff of claim 13 wherein the amount of the compound added to the foodstuff is between about 0.0005 and 0.05 percent by weight.

16. The process of imparting a popcorn-like flavor or aroma to a foodstuff which comprises incorporating therewith a small amount of a compound selected from the group consisting of 2-acetylpyrazine, 2-acetyl-6-methylpyrazine and 2-acetyl-5-methylpyrazine.

17. The process of claim 16 wherein the compound incorporated with the foodstuff is 2-acetylpyrazine.

18. The process of claim 16 wherein the compound incorporated with the foodstuff is 2-acetyl-6-methylpyrazine.

19. The process of claim 16 wherein the compound incorporated with the foodstuff is 2-acetyl-5-methylpyrazine.

References Cited

UNITED STATES PATENTS 2,677,686   5/1954   Smith et al. _____ 260—250

OTHER REFERENCES

A.P.C. Application to Lande Ser. No. 261,049 published May 11, 1943, now abandoned.

RAYMOND N. JONES, *Primary Examiner.*

H. H. KLARE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,051                    September 17, 1968

Donald L. Roberts

It is certified that error appears in the above identified patent and that said Letters Patent are hereby corrected as shown below:

Column 2, line 10, "5.5" should read -- 55 --; line 19, "quadruple" should read -- quadruplet --. Column 3, line 39, "0.2" should read -- 0.02 --; line 65, cancel "the", first occurrence. Column 4, line 56, "0.005" should read -- 0.05 --; line 68, "foodstuffs" should read -- foodstuff --; line 70, "inventin" should read -- invention --. Column 6, line 27, after "III" insert -- or --; line 45, "there" should read -- these --. Column 7, line 2, "0.03" should read -- 0.3 --.

Signed and sealed this 17th day of February 1970.

(SEAL)

Attest:

Edward M. Fletcher, Jr.                 WILLIAM E. SCHUYLER, JR.

Attesting Officer                         Commissioner of Patents